United States Patent [19]

Boueri et al.

[11] Patent Number: 4,487,303
[45] Date of Patent: Dec. 11, 1984

[54] AUTOMATIC TRANSMISSION START-UP CLUTCH CONTROL SYSTEM

[75] Inventors: Elias T. Boueri, Farmington Hills; Dennis C. Huntington, Canton, both of Mich.

[73] Assignee: Ford Motor Company, Dearborn, Mich.

[21] Appl. No.: 453,302

[22] Filed: Dec. 27, 1982

[51] Int. Cl.³ ............................................. B60K 41/28
[52] U.S. Cl. ............................. 192/0.052; 192/0.076; 192/0.092; 192/3.58; 364/424.1; 74/866
[58] Field of Search ............... 192/0.052, 0.032, 0.033, 192/0.075, 0.076, 0.092, 3.31, 3.58; 74/866, 752 D; 364/424.1

[56] References Cited

U.S. PATENT DOCUMENTS

| | | | |
|---|---|---|---|
| 4,081,065 | 3/1978 | Smyth et al. | 192/0.076 |
| 4,172,505 | 10/1979 | Rabus et al. | 192/0.076 |
| 4,200,175 | 4/1980 | Dick | 192/0.033 |
| 4,231,092 | 10/1980 | Grob | 364/424.1 |
| 4,244,244 | 1/1981 | Rembold et al. | 74/866 |
| 4,343,387 | 8/1982 | Hofbauer | 74/866 |

Primary Examiner—George H. Krizmanich
Attorney, Agent, or Firm—Frank G. McKenzie; Donald J. Harrington

[57] ABSTRACT

The start-up clutch of an automatic transmission is pressurized from a source of fluid pressure and vented through operation of a solenoid-operated clutch actuator valve. Operating parameters of the engine and transmission, the size of the throttle angle and setting of the PRNDL gear selector are continuously monitored, read and the valves stored for use in calculating the value of a duty cycle determined in accordance with control equations appropriate to the specific mode in which the driveline is operating. A driver circuit converts the duty cycle to a pulse width modulated waveform, which is used to electronically open and close an electrical circuit of which the solenoid winding is an element.

6 Claims, 6 Drawing Figures

AUTOMATIC TRANSMISSION START-UP CLUTCH CONTROL SYSTEM

BACKGROUND OF THE INVENTION

1. Field of the Invention

This invention relates to an automotive driveline wherein a friction clutch is used in place of a hydraulic torque converter to driveably connect the engine shaft to the input shaft of an automatic transmission. More particularly, the present invention relates to a system for controlling operation of the clutch in a neutral-idle condition, during acceleration of the vehicle and during certain conditions when reduction of driveline noise, vibration and harshness is required.

2. Description of the Prior Art

Hydraulically actuated, mechanically driven automatic transmissions generally include a torque converter having a turbine driven hydrodynamically from the impeller, the turbine transmitting power to a gearset to produce the reverse drive and forward drive ratios. When any forward or reverse gear is selected, and though the vehicle is coasting or standing at idle, the engine transmits torque through the torque converter, the clutches and gears to the drive wheels. Although the accelerator pedal is released, this causes the vehicle to creep forward against the action of the service brake which must be activated to keep the vehicle stationary. Normally, the gear selector must be moved to the neutral position to disengage the forward gear.

It is preferable that the transmission be automatically shifted to the neutral position from the forward gear position whenever engine power is not required during the idle and coasting condition. The engine idle system then can be calibrated to improve fuel economy by reducing the torque transmitted through the automatic transmission.

The output torque transmitted by the torque converter is a maximum when the device is started, i.e., when its output shaft is stalled, and varies substantially proportionally with the square of the impeller speed. When starting from rest, the efficiency of the torque converter is zero. As the turbine gains speed, its efficiency increases to a maximum, usually in the order of 85 to 90 percent, when the ratio of the turbine speed to the impeller speed is roughly 65 percent. As turbine speed increases toward 80 percent of the impeller speed, the efficiency declines from its maximum. Therefore, over a substantial portion of the operating range of the torque converter its efficiency is below 80 percent; at speed ratios less than 40 percent, its efficiency averages about 40 percent. For a vehicle operating at highway speed, when the output torque of the torque converter drops to the value of the input torque, the device operates as a hydraulic coupling and its efficiency ranges between 80 percent and 95 percent. It is preferred that the characteristics of the torque converter that permit transmission of power silently and smoothly without shock be realized in a device whose efficiency is at least in the upper range of the torque converter efficiency or preferably greater than this range.

SUMMARY OF THE INVENTION

The control system according to this invention permits, in the driveline of a motor vehicle equipped with an automatic transmission, the elimination of the hydraulic torque converter and the overrunning clutch, or lock-up clutch, normally used to cnvert the operation of the torque converter to that of a fluid coupling at highway speed. The size of the hydraulic pump employed to keep hydraulic fluid continuously circulating in the torque converter can be substantially reduced by the elimination of the torque converter since the pump output need only be sufficient to supply the requirements of the hydraulic control system and the cooling oil system. Furthermore, since the torque converter occupies considerable space in the vehicle, the package size of an automatic transmission having no torque converter is reduced. In a front wheel drive vehicle equipped with a transversely mounted engine and automatic transmission, this saving in space is important because of the limited lateral dimension within which the transmission must fit.

The control system according to this invention automatically places the transmission in neutral by disengaging the clutch, provided certain engine throttle, gear selector and vehicle speed conditions are met. Although complete disengagement of the clutch is preferred when the vehicle is placed in neutral, complete disengagement leads to unacceptable delay when the clutch is later engaged for start-up and induces the occurrence of abrupt increases in torque transmitted through the clutch when it is re-engaged. In order to avoid these difficulties, the clutch, under the operation of the control system according to this invention, is stroked and its torque capacity maintained at a predetermined value, as measured by the slip of the clutch, when the driveline is set for neutral operation. Engine speed is controlled to about 50 rpm below its idle speed by stroking the clutch, which assures that the clutch has some torque capacity. This preferred level of torque capacity is enough to preload the driveline and the friction plates of the clutch, but is not sufficient to cause the vehicle to creep forward.

The clutch is controlled for accelerating the vehicle from rest by using the engine speed as a feedback signal on the basis of which clutch pressure is modulated. The control system repetitively calculates a duty cycle, which is converted to an analog current signal applied to the winding of a solenoid valve through which the clutch piston is pressurized. The duty cycle is updated by a constant value at frequent intervals when the engine operates in an low range of speed, and in an upper range of engine speed, is incremented by a variable whose magnitude is inversely proportional to the difference between actual engine speed and the optimum engine speed. The control system operates to increase vehicle speed and to increase engine speed from idle speed to that engine speed at which maximum engine torque is produced for the throttle setting. When the maximum engine speed is reached, the clutch is fully engaged without slip.

The control system is adapted to reduce driveline vibration and to filter engine torque spikes by slipping the clutch a predetermined amount when the vehicle is operated at low speed and small throttle angles. The control system operates in these conditions to sense the difference between the actual slip across the clutch and a predetermined constant clutch slip. A duty cycle is repetitively calculated at frequent intervals to account for changes between the actual slip and a predetermined slip. The calculated duty cycle is converted to an analog signal that is applied to the winding of a solenoid valve that operates to pressurize and vent the clutch cylinder.

DESCRIPTION OF THE PREFERRED EMBODIMENT

Figure 1:
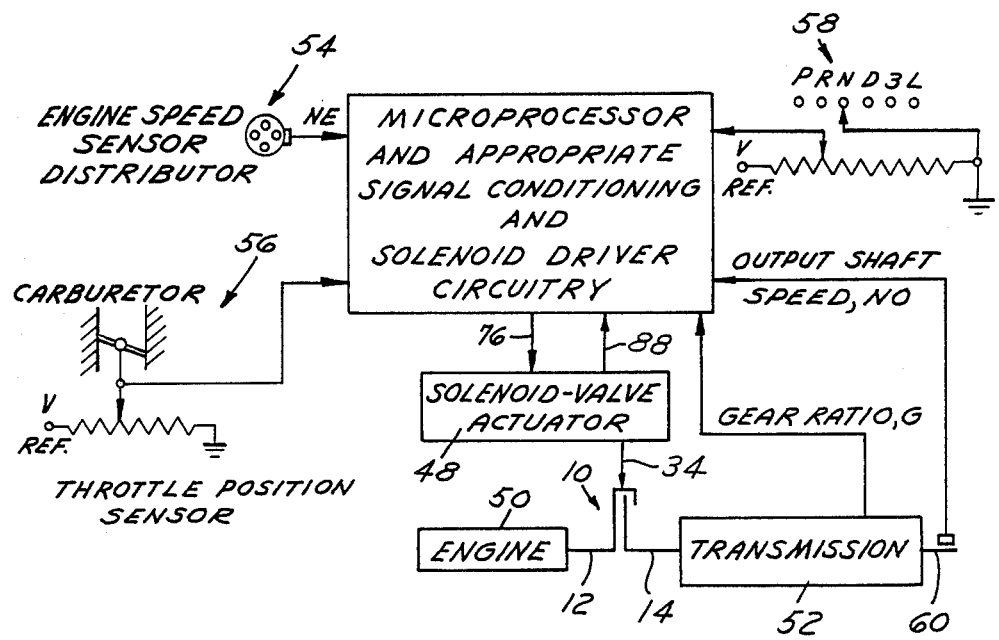
FIG. 1 is a schematic diagram of components of the control system according to this invention showing the various components that provide input information to the microprocessor and those that receive the information produced by the microprocessor.
Figure 2:
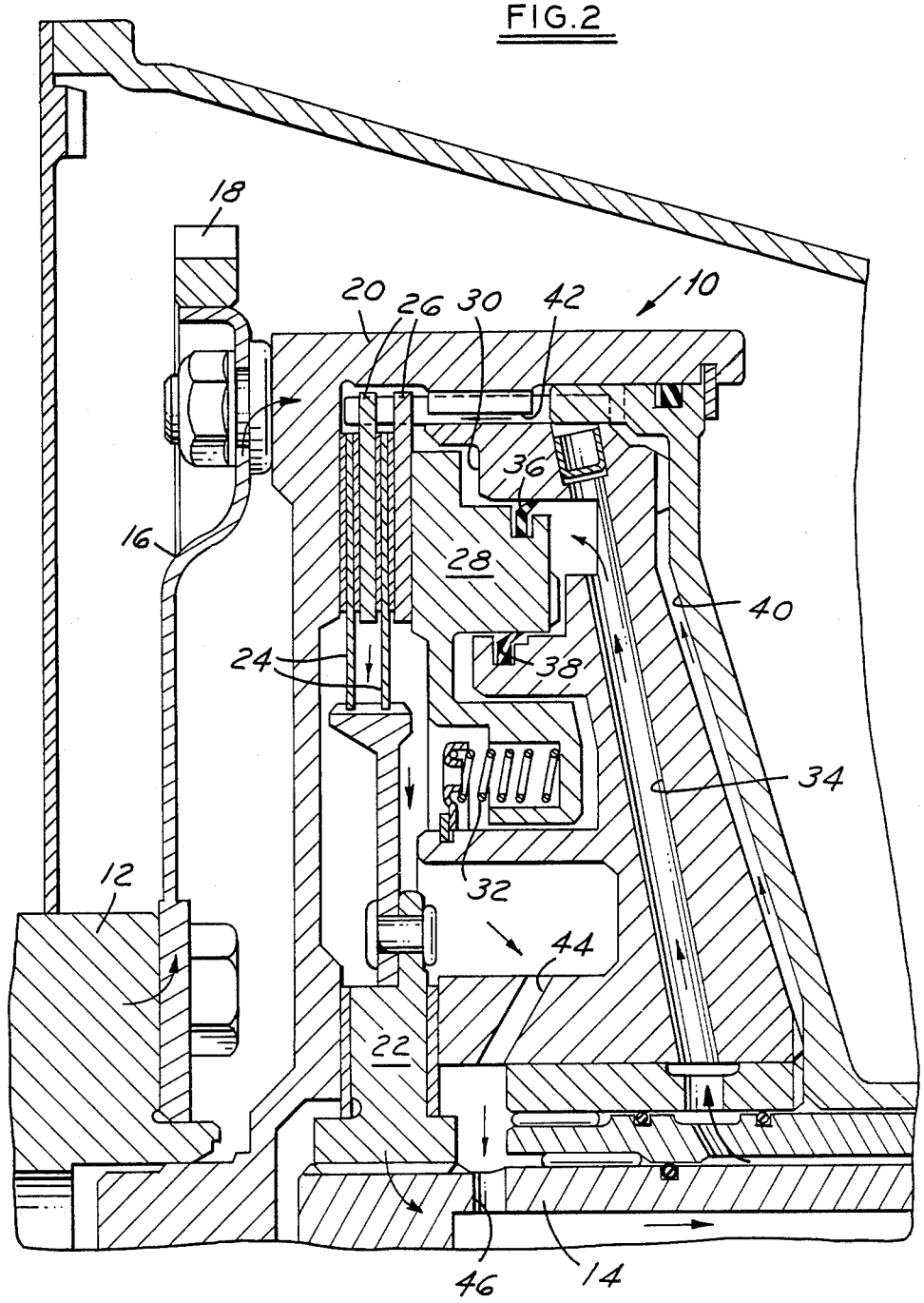
FIG. 2 is a cross section through the center line of a hydraulically actuated friction clutch located in an automatic transmission between the engine shaft and the input shaft of the transmission.

Referring first to FIGS. 1 and 2, the clutch 10, whose operation is regulated by the control system of this invention, is located in the driveline of a motor vehicle between the engine shaft 12 and the input shaft 14 of the automatic transmission. A flywheel 16 having a starter ring gear 18 mounted at its circumference is mechanically joined to the housing 20 of the clutch. The clutch hub 22 is splined to the input shaft 14 and provides spline teeth on its circumference by means of which clutch plates 24 are driveably connected. Located between clutch plates 24 are friction elements 26 mechanically fixed to the clutch housing. A piston 28 moves axially within a cylinder 30 formed in the housing and supports one end of a compressor spring 32 whose opposite end is fixed to the housing in order to return the piston to the right-hand end of the cylinder when pressure is removed from the cylinder. A hydraulic feedline 34 carries hydraulic fluid from a solenoid-operated valve to the pressurized side of cylinder 30 which is separated from the unpressurized side by two seals 36, 38. When cylinder 30 is pressurized, the piston moves against friction elements 26, which are forced into contact with the clutch plates 24, whereby engine shaft 12 is driveably connected to input shaft 14.

The clutch is cooled by circulating hydraulic fluid carried to the clutch through passage 40. The cooling fluid is pumped by the transmission pump and the action of centrifugal force radially outward in passage 40, axially forward in passage 42 through grooves formed in the clutch plates, and radially inward along the clutch hub and unpressurized side of the piston to return lines 44, 46 through which it is returned to the transmission sump.

The effects of centrifugal force produce in the spaces of the clutch assembly occupied by hydraulic fluid, a centrifugal pressure head that represents an increase in hydraulic pressure above that attributable to flow rate and friction. The cooling hydraulic fluid fills the clutch space on the left-hand side of piston seals 36 and 38, whereas the high pressure supply feedline 34 pressurizes the cylinder on the right-hand side of the seals. The pressure areas formed on the piston on which the high pressure actuating fluid is applied and the pressure surfaces on which the cooling hydraulic pressure is applied are sized so that equal pressure forces produced by centrifugal pressure effects are balanced; therefore the net effect of centrifugal force on fluid pressure is nil. Accordingly, when the clutch is to be engaged by the application of high pressure actuating fluid to the cylinder, the actuating fluid develops a force on the piston that is not counteracted by centrifugal pressure effects.

The control system for pressurizing and depressurizing the clutch cylinder includes a microprocessor and the appropriate electrical input signal conditioning circuitry and driver circuitry that converts a calculated duty cycle into an analog signal that is applied to the winding of a solenoid-operated actuator valve 48. The engine 50 of the vehicle has its shaft 12 selectively connected through operation of clutch 10 to the input shaft 14 of the transmission 52. The transmission may be of the kinds wherein speed ratios are produced by epicyclic or countershaft gearsets, or wherein a continuously variable range of speed ratios is produced by adjusting the diameters of pulleys engaged by endless, flexible belts, or these kinds in combination.

Input signals to the microprocessor are produced by an engine speed sensor 54, which converts the speed of the distributor rotor to an electrical signal representing engine speed, NE. A throttle position sensor 56 produces a voltage signal whose magnitude varies with the angular position of the throttle valve. Similarly, the position of the gear selector is sensed by a PRNDL sensor 58, which produces a voltage signal depending on the selected position. The speed of the transmission output shaft 60 is sensed by a tachometer that produces an input voltage signal that varies with, NO, the output shaft speed.

Figure 3:
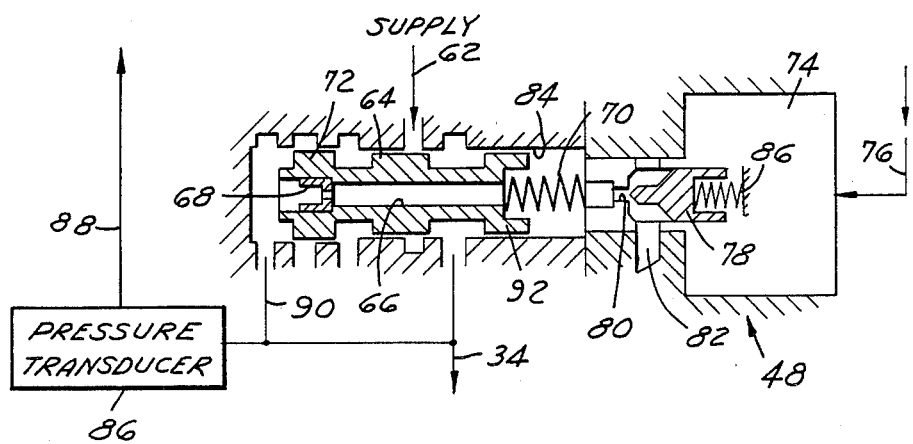
FIG. 3 is a cross section through the center line of a solenoid-operated hydraulic control valve that applies hydraulic pressure to the cylinder of the clutch shown schematically in FIG. 1.

FIG. 3 shows the solenoid-operated actuator valve 48 that opens and closes communication between a source of pressurized fluid, supplied to valve 48 through hydraulic line 62 and the clutch 10. The valve includes a valve spool 64 that moves within a chamber formed in the valve body between the position shown in the figure where the pressurized fluid supplied to clutch 10 through line 34 is regulated and another position where the inlet line 62 is closed by spool 64. The spool has a bore 66 extending along its length, which is fitted at its left-hand end with a plug 68 in which an orifice is formed. A compression spring 70 biases spool 64 leftward, but pressure forces developed on the end face of land 72 act against the force of the spring. An electrical solenoid 74 has a winding (not shown) that is energized through electrical line 76 from the driver circuitry in which an analog current signal is generated from a duty cycle calculated by the microprocessor. The solenoid includes a needle element 78 that is adapted to open and close an orifice 80 through which communication between a vent port 82 and cylinder 84 is regulated. Orifice 80 is normally closed, i.e., when the solenoid windings are not energized, by the force of a compression spring 86 which biases element 78 leftward. When electrical current is applied through line 76, magnetic forces operating in opposition to the force of spring 86 open orifice 80 for a period whose length varies with the magnitude of the duty cycle and its analog equivalent, the pulse width modulated voltage applied across the solenoid winding.

The solenoid coil is driven with a constant carrier frequency whose frequency may be in the range between 64 HZ and 100 HZ. According to the pulse width modulation technique, the voltage across the solenoid coil has aa square waveform that varies between zero and a maximum voltage. The period during which the voltage is a maximum corresponds to the period during which the carrier waveform is positive. The period during which solenoid voltage is zero corresponds to the period during which the carrier waveform is negative. The means for producing this conversion and for converting the calculated duty cycle to the carrier waveform will be discussed subsequently.

The pressure transducer 86 senses the pressure applied to the clutch cylinder through line 34 and provides a feedback signal to the microprocessor through electrical line 88. The valve has pressure forces developed on land 72 acting in opposition to the force of spring 70. When the solenoid coil is not energized, the pressure force on land 92 and the force of spring 70 overcome the pressure force on land 72 and force the spool to the left end of the chamber permitting communication between supply line 62 and hydraulic line 34, through which the clutch cylinder is pressurized. When the winding of the solenoid is energized, the pressure force on land 92 is removed by opening the end of chamber 84 to the vent port 82. In this case the pressure force on land 72 exeeds the force of spring 70 and the valve spool is forced to the right-hand end of the chamber thereby closing communication between hydraulic line 62 and line 34.

Figure 4:
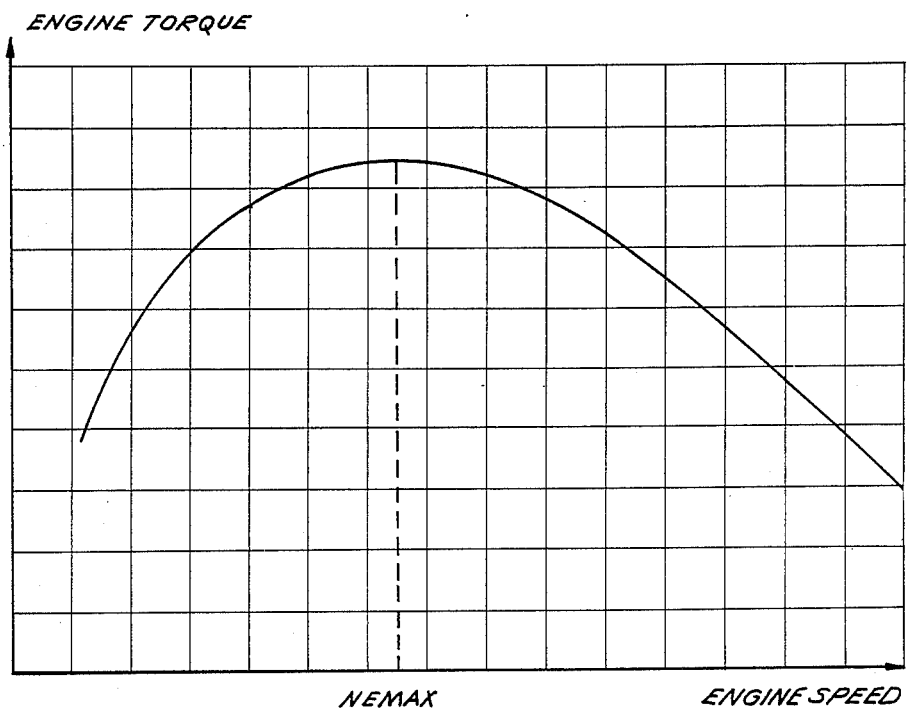
FIG. 4 is a graph showing the characteristic relationship between engine torque and engine speed for a particular throttle setting.

FIG. 4 shows the relationship between torque produced by the engine and the engine speed for a particular throttle setting. Data, which could be represented by a family of curves similar to this for the full range of throttle settings, is stored in the data base of the microprocessor. The system recognizes the existence of discrete operating regions wherein the clutch is controlled by programmed logic that differs from one region to the other, the regions being defined principally in terms of the engine throttle setting and the speed of the transmission output shaft.

Neutral-Idle Control

For example, a first region is associated with the neutral-idle condition, whose subroutine for calculating the duty cycle is enabled if the PRNDL selector is not set at Park or Neutral, the output shaft speed is equal to or less than a predetermined magnitude, and the throttle setting is less than a predetermined angle above its idle setting, provided it remains less than a greater predetermined angle above the idle setting.

During neutral-idle control, complete disengagement of the clutch is desirable, but if this occurs, an unacceptable delay will result when the vehicle is accelerated and the possibility of torque spikes transmitted from the engine through the transmission is increased when the clutch is abruptly applied. For this reason the neutral-idle control strategy attempts to stroke the clutch so that some torque is transmitted through the clutch. The engine speed is controlled to about 50 rpm below the idle speed. This reduction of engine speed assures that the clutch is at least partially stroked and has some torque capacity, which is used to preload the driveline but is not sufficiently high to cause the vehicle to creep forward.

When the neutral-idle control is enabled, the forward clutch duty cycle is repetitively calculated at frequent intervals as the solution to the following equation:

$$DC_c = DC_p - KP[NE_c - (NEIDLE - S)] + KD(NE_c - NE_p)$$

wherein:
$DC_c$ is the most recently calculated duty cycle, i.e., the current duty cycle;
$DC_p$ is a previously calculated duty cycle whose value is determined as a solution to this equation;
KP is the proportional gain;
KD is the derivative gain;
$NE_c$ is the current engine speed;
$NE_p$ is the previous engine speed;
NEIDLE is the engine idle speed; and
S is a predetermined clutch slip.

The process of calculating the duty cycle, reading engine speed, outputting the duty cycle to the solenoid winding and checking for the existence of the neutral-idle condition is performed repetitively at 10 msec. intervals.

Driveaway Control

During acceleration of the vehicle from a standing start, if the clutch is applied too quickly, the engine might stall or torque spikes in the driveline might occur. If the clutch is applied too slowly, the engine speed may increase too rapidly, far exceeding the engine speed at which maximum engine torque is produced, and a delay in the acceleration of the vehicle will occur. The strategy employed by this invention for modulating clutch pressure uses engine speed as a feedback signal on the basis of which the duty cycle of the solenoid winding is repetitively calcuated at frequent intervals. An increase in clutch pressure drops the engine speed because some of the engine torque is transmitted through the clutch to move the vehicle instead of accelerating the engine:

$$Te = Tc + I\alpha$$

where Te is the engine torque, Tc is the torque capacity of the clutch, I is the polar moment of inertia of the engine and accessories, and $\alpha$ is the angular acceleration of the engine. The clutch torque is proportional to clutch hydraulic pressure and the duty cycle calculated by the microprocessor is proportional to the clutch pressure.

It is the object of the driveaway control strategy to increase and hold the engine speed at NEMAX, the engine speed at which maximum torque results for a particular throttle setting. In the driveaway mode of operation, the clutch pressure is modulated to control the engine speed during the process of accelerating the engine, usually from NEIDLE, the engine idle speed, to NEMAX and to hold the engine speed at NEMAX until the slip across the clutch is approximately equal to a predetermined slip, preferably 50 rpm. As the engine accelerates, the torque capacity of the clutch increases; engine acceleration slows as engine speed approaches NEMAX. This result is realized according to the present invention by allowing the engine speed to increase linearly for a portion of the time required to accelerate the engine from NEIDLE to NEMAX, and by then reducing the rate of increase of engine speed gradually until NEMAX is reached, after which it is maintained. Engine acceleration is slowed automatically as engine speed approaches NEMAX in order to prevent engine speed from exceeding NEMAX and to prevent torque spikes that might result if clutch pressure were to increase suddenly.

According to the driveaway control system of this invention, the duty cycle is repetitively calculated at frequent intervals according to the following equation:

$$DC_c = DC_p - KP(NE_c - CNE) + KD(NE_c - NE_p)$$

where CNE is the commanded duty cycle and the other variables are as previously defined.

After each periodic calculation of the duty cycle, the commanded engine speed is incremented by a constant:

$$DELTA = \frac{NEMAX - NEIDLE}{T}$$

in which T is the time required for engine speed to increase from NEIDLE to NEMAX, divided by the number of periods in which the commanded engine speed is incremented during time T. For example, if the time required to change engine speed from NEIDLE to NEMAX is one second and CNE is updated every 10 msec., then T=100.

Figure 5:
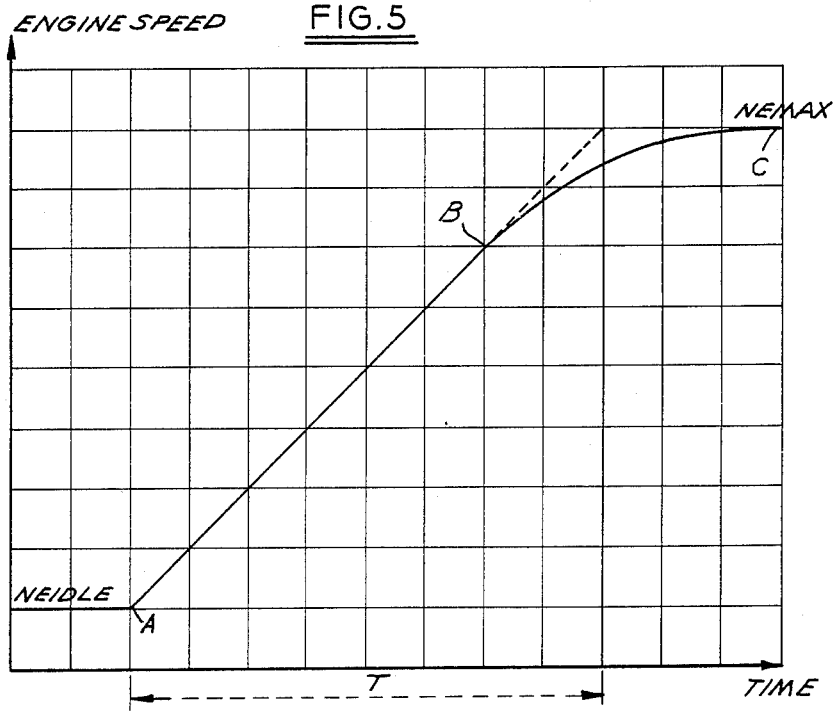
FIG. 5 is a graph showing for an accelerating vehicle the relationship between time and engine speed, which varies between idle speed and the speed at which maximum torque is produced.

FIG. 5 indicates, between points A and B, the rate at which engine speed increases over a linear range. Beyond point B, DELTA is no longer the unit by which CNE is incremented. In the range between B and C, the increment by which CNE is increased declines so that engine speed is not linearly increasing but instead undergoes a nonlinear transition to NEMAX.

When the engine speed is held at NEMAX and the engine is not accelerating, most of the engine torque is transmitted through the clutch to accelerate the vehicle.

From the equation for the duty cycle in the driveaway control system it can be seen that if the engine speed exceeds its commanded value, then the pressure on the clutch is increased. If the operator increases the throttle angle, a higher NEMAX value associated with the higher throttle setting is determined and this automatically causes the clutch to be fully engaged with no slip. When the clutch is fully engaged, the control system operates through repetitive calculation of the duty cycle and its conversion to a clutch pressure to hold engine speed at NEMAX.

NVH Control

A third region is the so-called NVH, or noise vibration harshness zone, wherein the clutch control system operates according to the magnitude of a frequently calculated duty cycle whose magnitude depends on the difference between the actual clutch slip and a comanded clutch slip.

Noise and vibration in the driveline are recognized problems when throttle angles are low but greater than the throttle angles that invoke the neutral-idle control system or the throttle angles generally associated with the coast-down condition. In order to reduce the driveline vibration and to filter engine-induced torque spikes, the start-up clutch of a transmission that employs the control system of this invention is slipped a predetermined amount, preferably in the range of 50 rpm, when the vehicle is operating in the NVH region. A predetermined amount of clutch slip is determined by repetitively calculating the duty cycle according to the following equation:

$$DC_c = DC_p + KP(S_c - S) + KD(S_c - S_p)$$

where $S_c$ is the current actual slip of the clutch, $S_p$ is the actual clutch slip determined at the previous interval at which data was taken, S is the commanded or predetermined slip, and the other variables are as previously defined. The actual current slip and actual previous clutch slip are calculated from the relationship:

$$S_{c,p} = NE - G^*ND$$

where NE is the engine speed, G the gear ratio, and ND the transmission output shaft speed, corresponding to the data interval at which the duty cycle is determined.

When the NVH control is invoked, the duty cycle is calculated frequently at short intervals, perhaps every 10 msec. If the actual slip exceeds the predetermined slip, S, clutch pressure increases because the duty cycle value changes, but as the clutch torque capacity increases, the actual slip is reduced. Alternatively, clutch pressure is reduced as actual slip falls below the commanded value due to the resulting change in the duty cycle value.

The microprocessor is programmed to repetitively calculate the duty cycle for the several control regions according to the method described in the preceding paragraphs. On the basis of the duty cycle a pulse width modulated signal 96 is produced; by any suitable means such as that described in U.S. patent application Ser. No. 393,208, filed June 23, 1982, the entire disclosure of which is made a part hereof by reference. The high period of the waveform varies with the magnitude of the duty cycle. This signal is applied to the base of an amplifier transistor arrangement 98 which is connected to the base of a switching transistor 100. A 12 volt power source 102 is applied to one end of the winding 104 of solenoid 74 which is connected at its other end to the collector of transistor 100. Signal 96, after amplification, is used to switch transistor 100 through which coil 104 is connected to ground. When transistor 100 conducts, solenoid 74 is energized, orifice 80 of actuator valve 48 is opened and clutch 10 is vented. During the period when transistor 100 is off, clutch 10 is pressurized. Of course, the solenoid actuator could be normally open, in which case conduction of current through coil 104 would operate to pressurize clutch 10.

Figure 6:
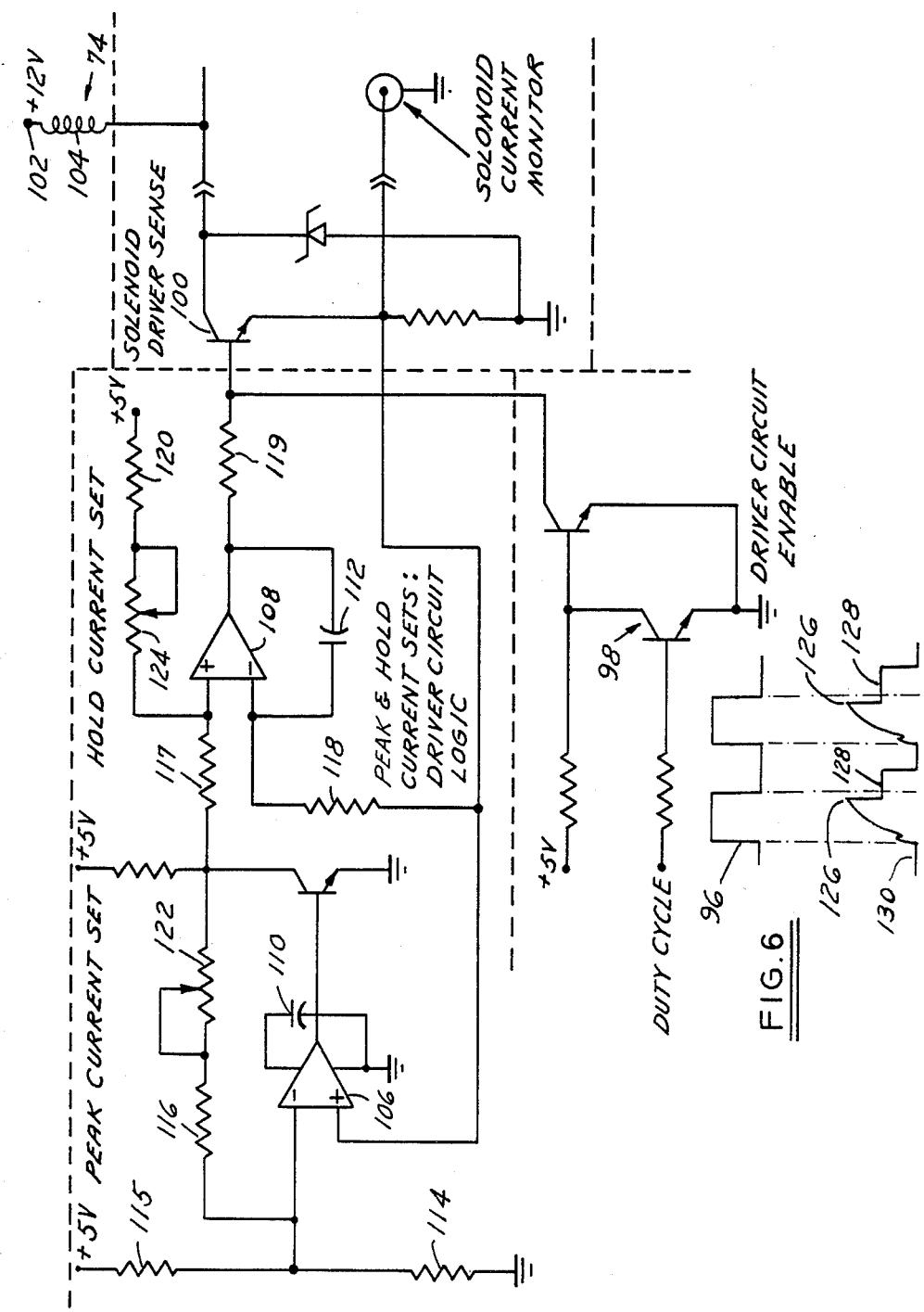
FIG. 6 is a schematic circuit diagram of the driving circuit that converts the calculated duty cycle to an analog current that energizes the winding of the solenoid.

A second portion of the solenoid driven circuit shown in FIG. 6 includes operational amplifiers 106, 108, feedback capacitors 110, 112 resistors 114-120 and potentiometers 122, 124. The circuit operates to limit the peak magnitude 126 of current in winding 104 and to produce a step-down 128 current in coil 104 after the peak current occurs. The current waveform 130 is plotted on the same time scale with the pulse width modulate waveform 96.

Having described a preferred embodiment of our invention what we claim and desire to secure by U.S. Letters Patent is:

1. A system for controlling the engagement and disengagement of a clutch adapted to driveably connect an engine to the automatic transmission of an accelerating vehicle comprising:
   means for producing a signal that represents the current rotational speed of the engine, $NE_c$;

means for producing a signal that represents the position at which the engine throttle is set;

a hydraulically actuated clutch for driveably connecting the engine shaft to the input shaft of the transmission;

a solenoid operated valve that opens and closes communication between a source of pressurized fluid and the clutch and between atmosphere and the clutch, whereby the clutch is pressurized and vented as the solenoid is energized and deenergized;

computing means for repetitively computing at frequent intervals the duty cycle of the solenoid, being provided with a data base that includes the values of the proportional gain of the system, KP, the derivative gain of the system, KP, the engine idle speed, NEIDLE, the engine speed at which the engine produces maximum torque corresponding to the current engine throttle setting, NEMAX$_c$, and a predetermined clutch slip, S, the computing means being adapted to repetitively calculate current speed difference values [NE$_c$−(NEIDLE−S)], to store in memory and recall from memory the previous engine speed, NE$_p$, the previously calculated solenoid duty cycle values, DC$_p$, and to repetitively calculate the current solenoid duty cycle, DC$_c$, from the relationship $$DC_c = DC_p - KP[NE_c - (NEIDLE - S)] + KD(NE_c - NE_p);$$

means for incrementing (NEIDLE−S) at frequent intervals by the amount (NEMAX$_c$−NEIDLE)/T where T is a portion of a predetermined period for increasing engine speed from NEIDLE to NEMAX; and means for converting the current solenoid duty cycle to an analog current pulse that is applied to the solenoid.

2. The system of claim 1 further comprising:

means for incrementing (NEIDLE−S) at frequent intervals, when engine speed exceeds a predetermined engine speed between NEIDLE and NEMAX, the magnitude of the increment declining from (NEMAX$_c$−NEIDLE)/T at the predetermined engine speed to zero at NEMAX.

3. The system of claim 3 wherein the magnitude of the increment by which (NEIDLE−S) is changed at frequent intervals when engine speed exceeds a predetermined engine speed between NEIDLE and NEMAX, is inversely proportional to (NE$_c$−NEMAX).

4. A system for controlling the engagement and disengagement of a clutch adapted to driveably connect an engine to an automatic transmission comprising:

means for producing a signal that represents the position at which the engine throttle is set;

means for producing a signal that represents the current rotational speed of the engine, NE$_c$;

means for producing a signal that indicates the drive range at which the gear selector is positioned;

means for enabling the control system, provided the gear selector means is not in the neutral or park ranges, the throttle position is substantially closed and the vehicle speed is equal to or less than a predetermined value;

a hydraulically actuated clutch for driveably connecting the engine shaft to the input shaft of the transmission;

a solenoid operated valve that opens and closes communication between a source of pressurized fluid and the clutch and between atmosphere and the clutch, whereby the clutch is pressurized and vented as the solenoid is energized and deenergized;

computing means for repetitively computing at frequent intervals the duty cycle of the solenoid, being provided with a data base that includes the values of the proportional gain of the system, KP, the derivative gain of the system, KD, engine idle speed, NEIDLE, and a predetermined clutch slip, S, the computing means being adapted to repetitively calculate current speed difference values [NE$_c$−NEIDLE−S)]

to store in memory and recall from memory calculated instantaneously speed difference values [NE$_c$−(NEIDLE−S)], the previous engine speed NE$_p$, the previously calculated solenoid duty cycle values, DC$_p$, and to repetitively calculate the current solenoid duty cycle, DC$_c$, from the relationship $$DC_c = DC_p - KP[NE_c - (NEIDLE - S)];$$

and means for converting the current duty cycle to an analog electrical current pulse that is applied to the solenoid.

5. A system for controlling the slip of a clutch adapted to driveably connect an engine to the automatic transmission of a vehicle comprising:

means for producing a signal that represents the current rotational speed of the engine, NE;

means for producing a signal that represents the position at which the engine throttle is set;

means for enabling the control system, provided the vehicle speed is equal to or less than a predetermined speed, and the throttle position is equal to or less than a predetermined open position;

a hydraulically actuated clutch for driveably connecting the engine shaft to the input shaft of the transmission;

a solenoid operated valve that opens and closes communication between a source of pressurized fluid and the clutch and between atmosphere and the clutch whereby the clutch is pressurized and vented as the solenoid is energized and de-energized;

computing means for repetitively computing at frequent intervals the duty cycle of the solenoid, being provided with a data base that includes the values of the proportional gain of the system, KP, the derivative gain of the system, KD, and a predetermined clutch slip, S, adapted to repetitively calculate current slip of the clutch, S$_c$, to store in memory and recall from memory previously calculated clutch slip values, S$_p$, and previously calcuated duty cycle values, DC$_p$, and to repetitively calculate the current duty cycle, DC$_c$, from the relationship $$DC_c = DC_p - KP(S_c - S) + KD(S_c - S_p);$$

and means for converting the value of the current duty cycle to an analog electrical current and for applying said electrical current to the solenoid winding.

6. The control system of claim 5 further comprising:

means for producing a signal that represents the current rotational speed of the output shaft of the transmission, $ND_c$; and wherein the computing means has a data base that further includes the ratio, G, of the speed of the transmission input shaft to the speed of the output shaft from which the current clutch slip is calcuated from the relationship $S_c = NE_c - G*ND_c$.

* * * * *